United States Patent

[11] 3,559,619

| [72] | Inventor | Carl W. Johnson |
| | | Neenah, Wis. |
| [21] | Appl. No. | 795,824 |
| [22] | Filed | Feb. 3, 1969 |
| [45] | Patented | Feb. 2, 1971 |
| [73] | Assignee | Kimberly-Clark Corporation |
| | | Neenah, Wis. |
| | | a corporation of Delaware |

[54] APPARATUS FOR APPLYING ADHESIVE ON STRIP MATERIAL
7 Claims, 6 Drawing Figs.

[52] U.S. Cl. ............................................. 118/104,
118/401, 118/405, 118/429
[51] Int. Cl. ................................................. B05c 11/02
[50] Field of Search .......................................... 118/401,
409, 405, 104, 419, 420, (300); 117/109

[56] References Cited
UNITED STATES PATENTS

| 1,955,414 | 4/1934 | Dickhaut | 118/104 |
| 2,102,059 | 12/1937 | Convers | 118/104 |
| 2,361,818 | 10/1944 | Brightwell | 118/401 |
| 2,980,956 | 4/1961 | Whitehurst et al. | 118/401X |
| 3,049,441 | 8/1962 | Huang | 117/115 |
| 3,175,532 | 3/1965 | Muggleton | (118/104X) |
| 3,179,083 | 4/1965 | Warner | 118/104 |
| 3,194,210 | 7/1965 | Harris | 118/104 |
| 3,343,977 | 9/1967 | Gjesdal | 118/405X |
| 3,387,585 | 6/1968 | Farrell | 118/104 |

FOREIGN PATENTS

| 1,277,313 | 10/1961 | France | 118/405 |

Primary Examiner—Morris Kaplan
Attorney—Wolfe, Hubbard, Leydig, Voit & Osann

ABSTRACT: A gluing unit for applying liquid adhesive to thin-walled paper tape is disclosed. The unit includes a slotted glue head for applying the adhesive to both sides of the tape and a pair of counterrotating rolls for wiping excess adhesive from the surfaces of the tape. The unit also includes a heat exchanger for heating the glue to make it less viscous and means for flushing the surfaces of the wiping rolls with freshly heated adhesive to carry away the excess adhesive and any foreign matter wiped from the tape.

INVENTOR
CARL W. JOHNSON

INVENTOR,
CARL W. JOHNSON
BY
Wolfe, Hubbard, Voit & Osann
ATTORNEYS.

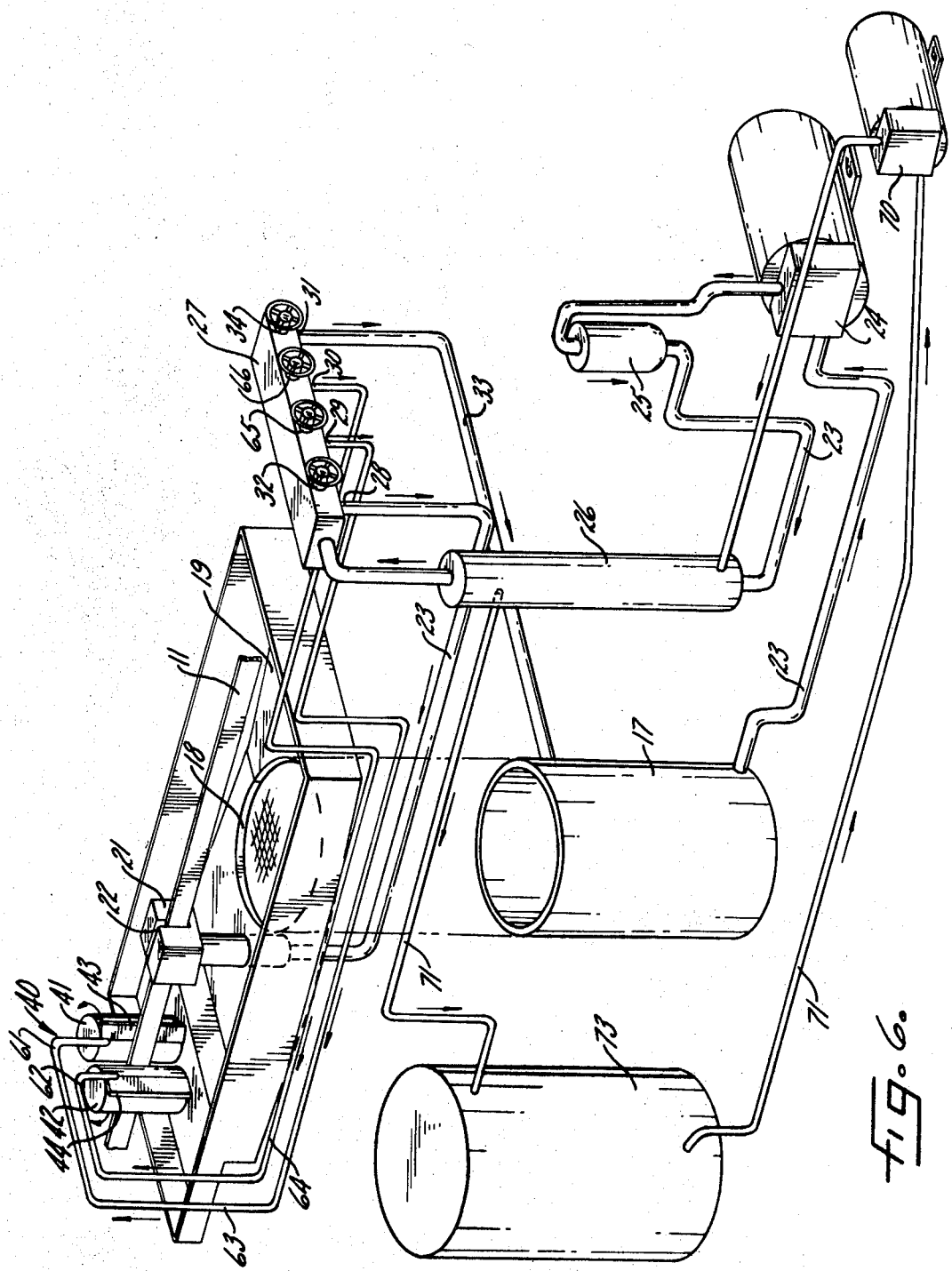

APPARATUS FOR APPLYING ADHESIVE ON STRIP MATERIAL

BACKGROUND OF THE INVENTION

The present invention relates to adhesive-applying apparatus and more particularly concerns apparatus for applying a thin but uniform layer of adhesive to both surfaces of thin strip material.

In copending application Ser. No. 726,522, filed May 3, 1968, and entitled "Laminated Tube Structure and Method and Apparatus for Manufacturing Same" and in which I am one of the joint applicants, there is disclosed a method and apparatus for making a three-ply laminated tube structure particularly suited for use in the fabrication of tampon applicator devices or the like. The tube structure includes a glazed tissue inner ply having a relatively high fold endurance, a thin outer ply made of high quality, high strength paper having an extremely smooth coating on the exterior surface, and a relatively thick intermediate ply of short-fibered, porous, blotter-type paper having negligible fold endurance and interposed between and bonded to the inner and outer plies by a brittle, water-soluble adhesive. As there disclosed, the three strips of paper are supplied from separate supply roll unwind stands; under constant, low tension, to the fixed mandrel of a helical tube winding apparatus. Between its unwind stand and the mandrel, the intermediate strip of paper is impregnated with liquid adhesive which quickly becomes tacky and bonds the intermediate ply to the inner and outer plies as they are wound on the mandrel.

In the above above-mentioned application, the adhesive applying apparatus includes a pressurized source of heated, and thus low viscosity, liquid adhesive; a horizontally slotted glue spout through which the strip material passes as the adhesive is directed over both surfaces of the material; and a pair of rounded edge doctor blades for wiping excess adhesive from the surfaces of the strip material. While the operation of that unit is generally satisfactory, the horizontal disposition of the strip material and the arrangement of the doctor blades tend to promote accumulation of excess adhesive thereon. As this adhesive cools it becomes quite viscous and leads to the accumulation of further adhesive on the doctor blades and an uneven application of adhesive to the strip material. Also the accumulation of excess adhesive on the doctor blades increases the resistance to passage of the strip material and due to the low wet strength of the saturated strip material it may rupture due to the tension imposed by the helical winding apparatus.

SUMMARY OF THE INVENTION

Accordingly, it is the primary aim of the present invention to provide an improved apparatus for applying closely controlled amounts of liquid adhesive to the surfaces of thin strip material.

It is a more particular object to provide an apparatus for applying liquid adhesive to the surfaces of thin strip material which apparatus includes means for uniformly wiping the excess adhesive from the surfaces of the material without the accumulation of excess adhesive on the wiping means.

A more specific object is to provide an adhesive applying apparatus of the above type in which the wiping means includes a pair of counterrotating wiping rolls engageable with the strip material and a pair of doctor blades and a doctor blade engageable with each of the rolls for removing excess adhesive therefrom.

A further detailed object is to provide an apparatus of the above character with means for flushing the wiping rolls and doctor blades with freshly heated liquid adhesive to carry away the excess adhesive and any foreign matter wiped from the surfaces of the strip material.

Other objects and advantages of the invention will become more readily apparent upon reading the following detailed description and upon reference to the drawings in which:

FIGS. 1 and 2, respectively, are side and end elevations of a preferred form of the adhesive applying apparatus of the present invention, with certain portions broken away to show internal details;

FIG. 6 is a schematic fluid circuit for the apparatus.

Figure 1:
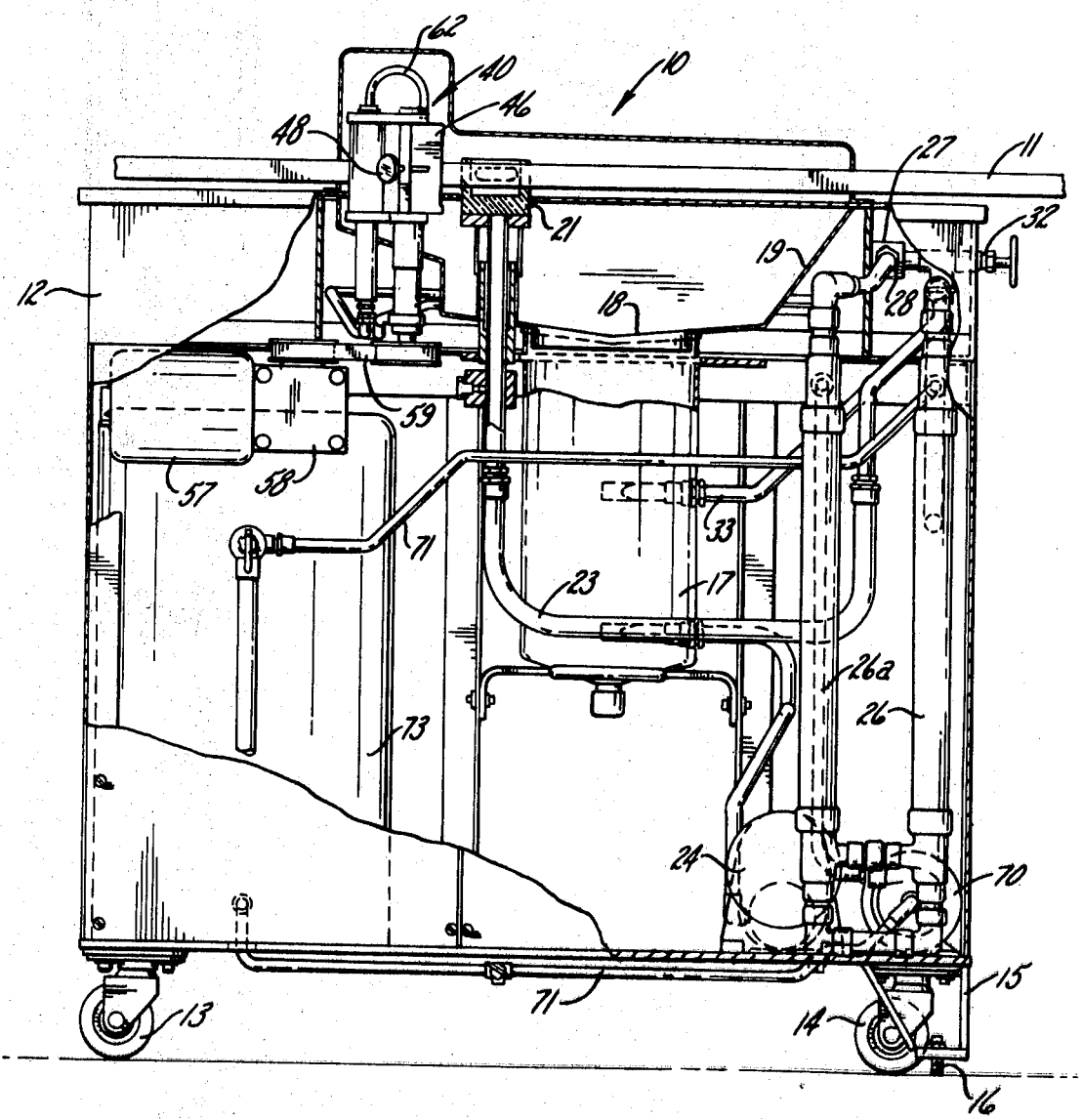
Figure 2:
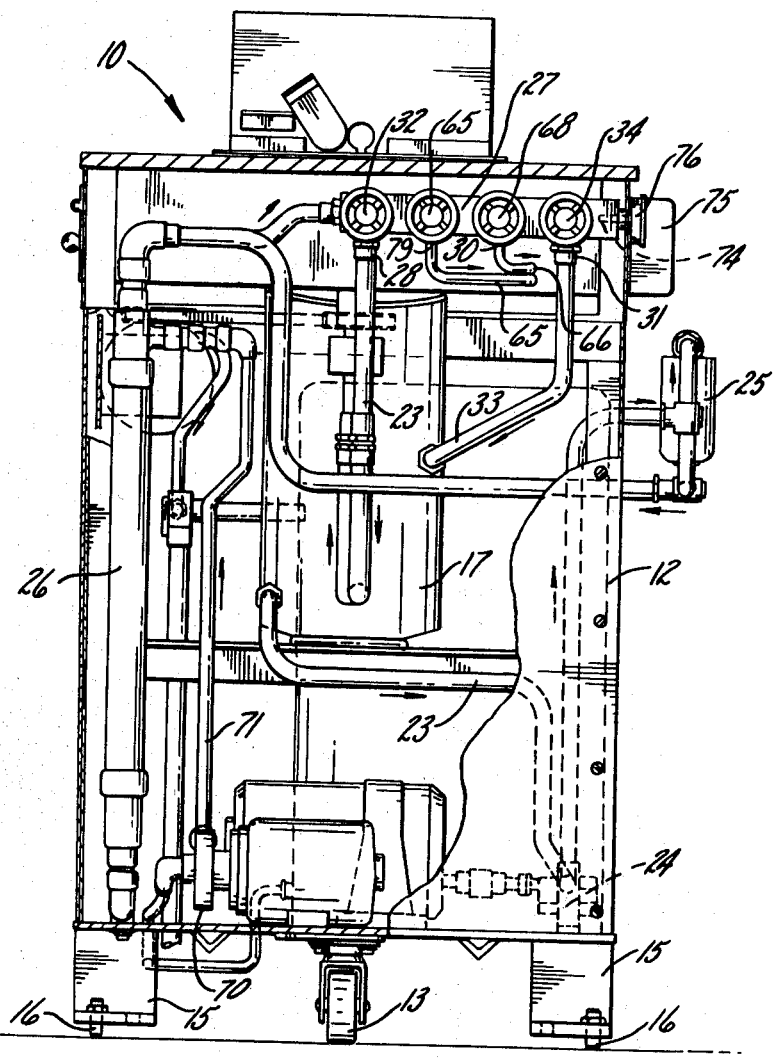
Figure 3:
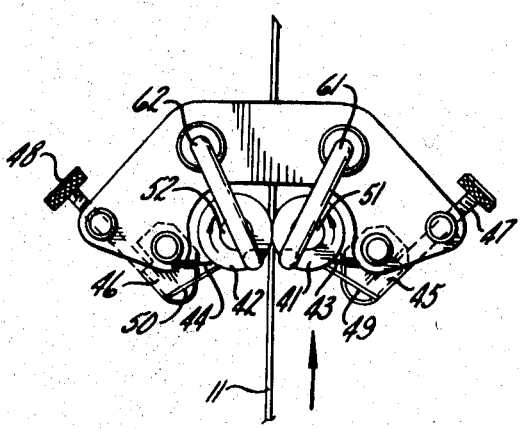
FIG. 3 is an enlarged plan view of the wiping rolls and doctor blade assembly of the apparatus shown in FIGS. 1 and 2.

Turning now to the drawings, there is shown in FIGS. 1 and 2 a preferred form of the apparatus 10 for applying adhesive to thin strip material such as paper tape 11. The apparatus 10 is enclosed in a portable stand 12 supported by front and rear caster wheels 13 and 14. Adjacent the lower rear corners of the stand 12, a pair of leveling and locating legs 15 are preferably provided. Each of the legs 15 includes an adjustable foot bolt 16 for leveling the stand 12. The foot bolts 16 also serve to help locate and maintain the stand in the proper position on the floor.

Figures 4, 5:
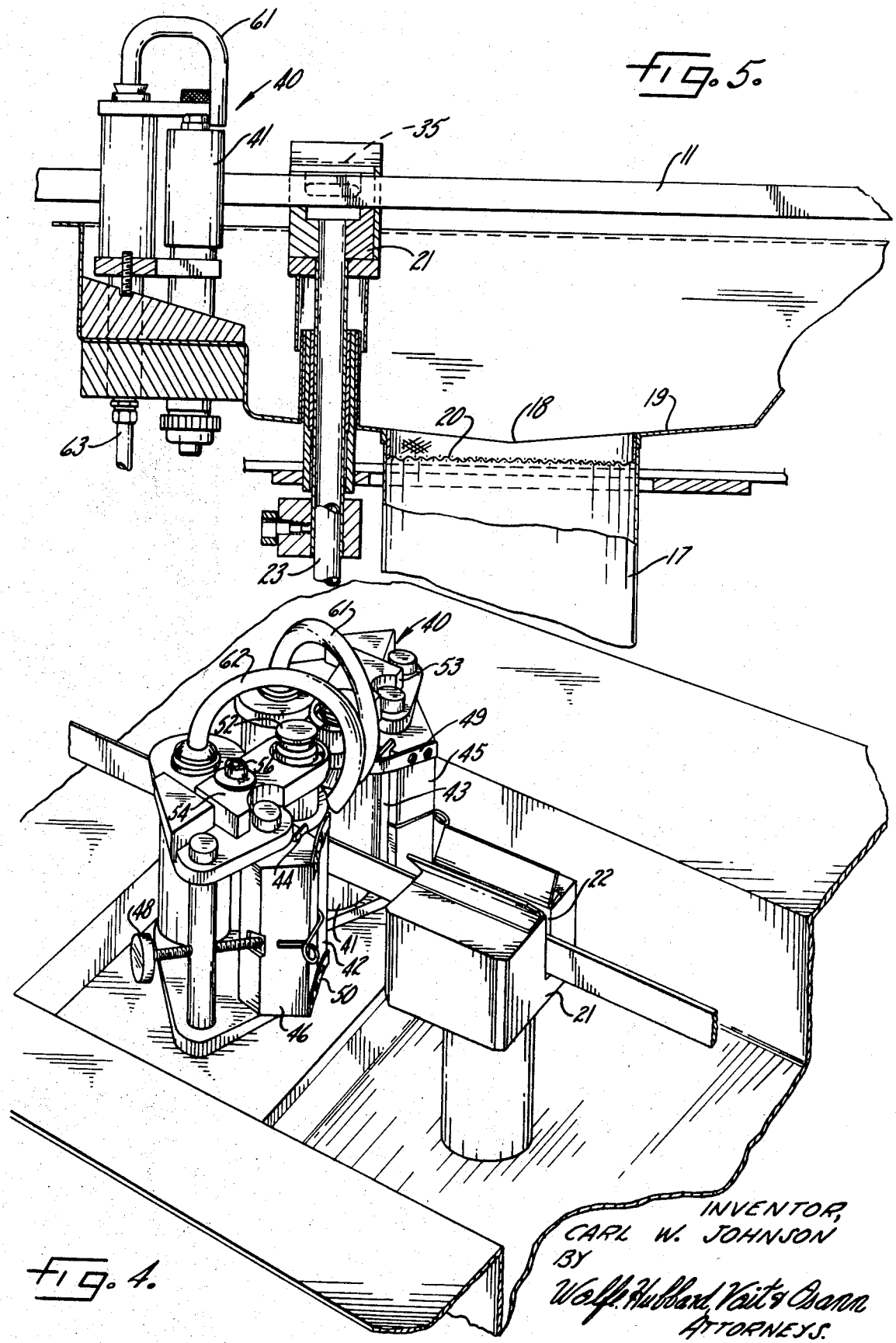
FIG. 4 is an enlarged fragmentary perspective view of the glue applying spout and wiping rolls and doctor blade assembly of the apparatus.
FIG. 5 is an enlarged fragmentary side elevation, partially in section, of the apparatus shown in FIG. 4.

Within the stand 12, the apparatus 10 includes an adhesive reservoir 17 located below an opening 18 in a catch basin 19 disposed in the upper portion of the stand. A screen 20 is preferably installed in the reservoir 17 below the opening 18 in the basin 19. Projecting up through the catch basin 19 is an adhesive fountain 21 (see FIGS. 1, 4 and 5) which is provided with a slot 22 through which the strip material 11 is adapted to pass. The slot 22 in the fountain 21 is preferably located vertically along the longitudinal centerline of the catch basin 19.

The fountain is supplied with adhesive from the reservoir through a conduit 23. Adhesive is drawn from the reservoir 17 by a motor-driven pump 24 and is discharged under pressure through a filter 25, into heat exchanger means 26 and 26a and then into a manifold 27 having a plurality of valved outlets 28—31. The conduit 23 connects manifold outlet 28 with the fountain 21 and the amount of adhesive delivered to the fountain from the reservoir 17 is controlled by a valve 32 in the manifold which regulates the outlet 28. A bypass line 33 connected to outlet 31 of the manifold 27 is also used to regulate the flow of adhesive. For this purpose, a valve 34 is provided in the manifold outlet to the bypass line 33. By adjusting the valves 32 and 34 the flow from the pump 24 can be split so that the required amount of adhesive is supplied to the fountain 21.

Within the fountain 21 a pair of horizontally disposed orifices 35 and 36 communicate with the conduit 23. As adhesive is delivered to the fountain it is discharged from the orifices 35 and 36 against and over both sides of the strip material 11. The valve 32 is set so that an excess amount of adhesive issues from the orifices and flows out through the top and ends of the slot 22. This excess adhesive flows down into the catch basin 19, through the opening 18 and screen 20 and into to the reservoir 17 (see FIG. 5).

In accordance with the present invention, the strip material 11 passes from the fountain 21 to a doctor unit 40 to wipe the excess adhesive from the surfaces of the strip material. The doctor unit includes a pair of counterrotating wiping rolls 41 and 42 each of which is engaged by a doctor blade 43 and 44, respectively. The doctor blades 43 are mounted on pivot blocks 45 and 46 and are maintained in engagement with their respective rolls 41, 42 by means of adjusting screws 47 and 48 which move the pivot blocks 45, 46 against the bias exerted by leaf springs 49, 50 mounted on the pivot blocks and engageable with their respective wiping rolls.

Each of the wiping rolls 41, 42 are journaled on respective shafts 51 and 52 mounted on respective lever arms 53 and 54 pivoted on shafts 55 and 56. Thus, the biasing force of the springs 49, 50 also controls the nip pressure of the counterrotating wipe rolls 41, 42 to maintain a uniform wiping action on both surfaces of the strip material. The rolls 41, 42 are preferably driven by an electric motor 57 through a gear reduction unit 58 and a drive belt 59 (see FIG. 1). Conventional reversing gears (not shown) may be employed to achieve the counterrotating directions of the respective wiping rolls 41, 42.

To prevent the accumulation of excess adhesive or the collection of foreign matter on the surfaces of the wiping rolls 41, 42 and doctor blades 43, 44, these components are continuously flushed with fresh hot adhesive from flushing spouts 61 and 62. Each of the spouts 61, 62 is supplied with liquid adhesive from the reservoir 17 by the pump 24 through respective conduits 63 and 64 connected to valved outlets 29 and 30 in the manifold 27. The flow of adhesive through each of the outlets 29 and 30 and thus through the conduits 63, 64 and spouts 61, 62 is controlled by valves 65 and 66 in the manifold in cooperation with the valves 32 and 34 which regulate the flow of adhesive to the fountain 21 and through the bypass 33.

The viscosity of the adhesive must be such that it quickly penetrates and completely wets the strip material 11. As a result, as little time as possible is lost in this process and a relatively high strip velocity can be maintained. Swift & Company Adhesive No. 2706 is such a high viscosity adhesive at room temperature but is decidedly less viscous when heated. An adhesive temperature of between 150° and 160° F. has been found particularly satisfactory. At lower temperatures, the adhesive is too viscous; at higher temperatures, chemical breakdown of the adhesive begins. The reduced viscosity of the adhesive not only assures complete, rapid saturation of the strip material but makes the adhesive become tacky more quickly so that the apparatus can be run at a higher speed. Complete impregnation of the strip material by the adhesive also assures that the desired ultimate brittleness in the finished material will be obtained. Maintaining the adhesive at a low viscosity also substantially reduces the force required to draw the strip material 11 the through the do doctor mechanism 40 described above. This is especially significant with respect to strip which is weak in the dry state and very weak when soaked.

Temperature control of the adhesive is accomplished by the heat exchanger means 26 surrounding the conduit 23 downstream of the pump 24. Hot water is circulated by a pump 70 through a closed circuit 71 into and out of the heat exchanger 26 from a supply tank and heater unit 73. A temperature sensor 74, in contact with the adhesive at a point within the manifold 27, is connected to a thermostat control system 75 which regulates the operation of the water pump 70. A temperature gauge 76, for observing the adhesive temperature, is connected to the manifold 27 near the temperature sensor 74.

During operation of the apparatus adhesive is supplied to the fountain 21 under pressure by the pump 24 so that adhesive fills substantially the whole interior of the slot 22 to thoroughly wet both faces and both edges of the strip material 11. In one practical example, the pressure at the pump outlet is 40—50 p.s.i. The pressure drop between the pump outlet and the fountain is substantial; the pressure at the fountain should be sufficient to fill the slot 22 and prevent formation of bubbles within the fountain which would result in dry spots on the strip material 11.

Excess adhesive from the fountain 21 flows down into the catch basin 19, through the opening 18 and into the reservoir 17. In addition, the excess adhesive wiped from the strip material 11 by the counterrotating wipe rolls 41 and 42 and the adhesive used to continuously flush the surfaces of the wipe rolls 41, 42 and doctor blades 43, 44 also flows down into the catch basin 19 and into the reservoir 17.

From the foregoing, it will be appreciated that the apparatus constantly circulates liquid adhesive, heated to a low viscosity, to the fountain 21 where it is applied to the strip material. The excess is then wiped from the strip material by the wiping rolls 41, 42 to provide a uniform and even coating of adhesive on both surfaces of the strip material.

I claim:

1. Apparatus for applying adhesive to both surfaces of thin strip material comprising, in combination:
   a source of liquid adhesive;
   an adhesive fountain defining a slot through which said strip material is adapted to pass;
   a pump connected by conduit means between said source and fountain for delivering liquid adhesive under pressure through said fountain and over the opposite surfaces of said strip material as it passes through said slot;
   a pair of closely spaced counterrotating rolls defining a wiping nip disposed substantially in alignment with said slot and located downstream therefrom in the direction of strip movement;
   means for rotating said rolls such that the peripheries thereof at said nip move opposite to said direction of strip movement for wiping excess adhesive from the surfaces of said strip material;
   a doctor blade disposed adjacent the periphery of each of said rolls for removing excess adhesive therefrom;
   said fountain and said rolls being located in a catch basin communicating with said source for returning excess adhesive thereto; and
   means for directing additional liquid adhesive over the periphery of each of said rolls between said nip and said doctor blade for flushing away said excess adhesive and any foreign matter picked up from said strip material.

2. Apparatus as defined in claim 1 wherein said conduit means includes a heat exchanger between said pump and said fountain for raising the temperature of the liquid adhesive passing therethrough.

3. Apparatus as defined in claim 2 wherein said heat exchanger is of the fluid circulating type and said apparatus includes a source of heated fluid and means for circulating said heated fluid through said heat exchanger.

4. Apparatus as defined in claim 2 including a distribution manifold located in said conduit means between said heat exchanger and said fountain and including valving for controlling the quantity of adhesive delivered to said fountain and to each of said flushing means.

5. Apparatus as defined in claim 1 wherein each of said rolls is adjustably mounted for movement toward and away from the other of said rolls whereby the spacing and alignment of said nip may be selectively adjusted.

6. Apparatus as defined in claim 1 including means for adjustably positioning each of said doctor blades relative to the periphery of its respective roll.

7. Apparatus as defined in claim 6 wherein said adjusting means includes a biasing element engageable with said respective rolls for adjusting the nip pressure of said rolls on said strip material.